Dec. 11, 1951     L. W. HAMPTON     2,578,243
LOAD CARRYING ATTACHMENT FOR BICYCLES,
MOTORCYCLES AND THE LIKE
Filed Dec. 15, 1949
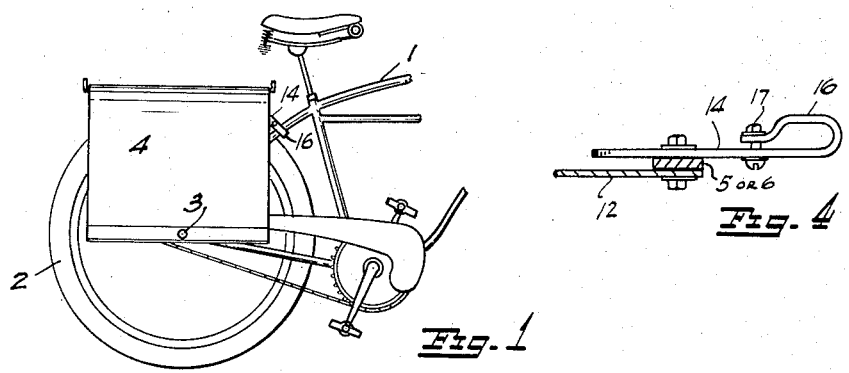
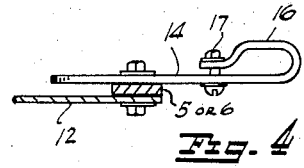
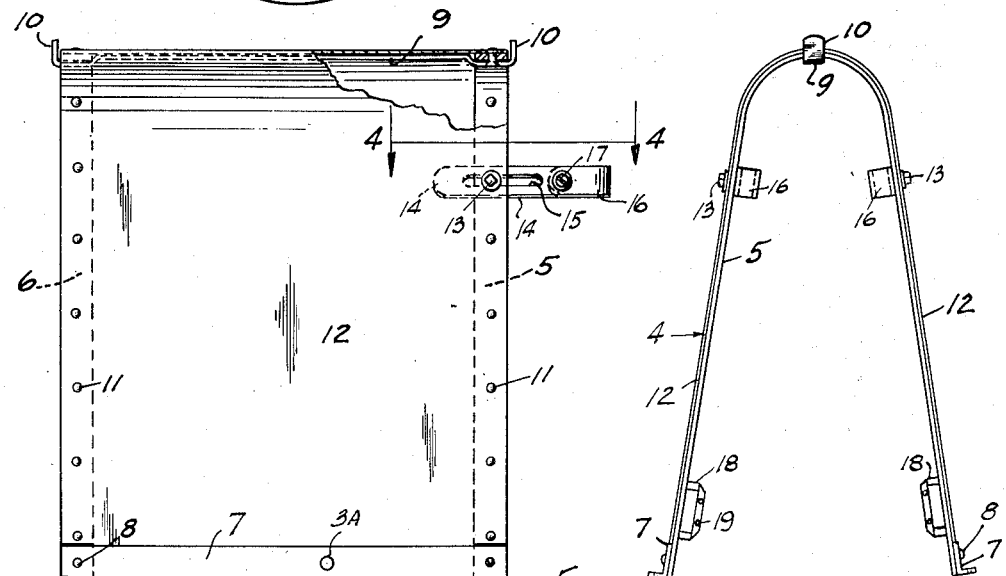
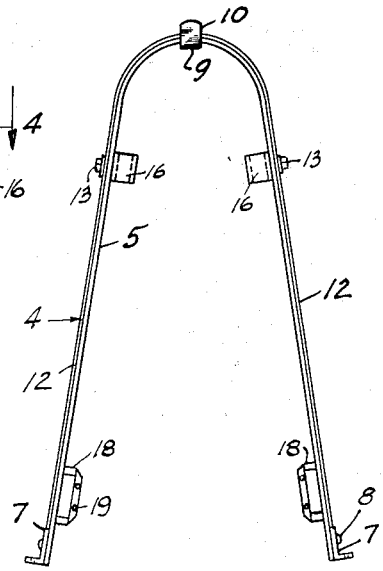
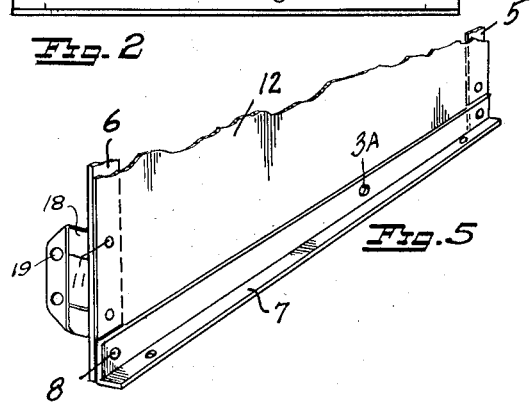
LUCIAN W. HAMPTON
INVENTOR.
BY
ATT'Y Patented Dec. 11, 1951

2,578,243

UNITED STATES PATENT OFFICE 2,578,243

LOAD CARRYING ATTACHMENT FOR BI-CYCLES, MOTORCYCLES, AND THE LIKE

Lucian W. Hampton, Portland, Oreg.

Application December 15, 1949, Serial No. 133,049

1 Claim. (Cl. 224—32)

This invention relates to improvements in carrying devices and more especially to a device adaptable for attachment to the rear or front wheels and frames of bicycles, motorcycles, and the like, to provide a support for divided loads such as two compartment paper carrier bags, saddle bags and the like.

It is one of the principal objects of the invention to provide a device of this character in the form of a hood adapted to embrace the upper portion of a wheel and to be secured to the wheel axle and to the frame to which the wheel is attached.

Another object is the provision of a carrier of this character which is capable of supporting a relatively heavy load equally divided on both sides of the wheel and without interfering with the normal pedaling or braking operation of the bicycle.

The foregoing and other objects will appear as my invention is more fully hereinafter described in the following specification, illustrated in the accompanying drawing and finally pointed out in the appended claim.

In the drawing:

Figure 1 is a fragmentary side view of a bicycle showing a load carrying device made in accordance with my invention attached to the frame and rear axle of the bicycle.

Figure 2 is an enlarged side elevation of the load carrying device with a fragment broken away for convenience of illustration.

Figure 3 is an end elevation of Figure 2.

Figure 4 is an enlarged sectional plan view taken approximately along the line 4—4 of Figure 2.

Figure 5 is a fragmentary perspective detail view.

Referring now more particularly to the drawing:

In Figure 1 I have shown a fragment of a bicycle having the usual frame 1, and rear wheel 2 mounted upon an axle 3 secured to the frame in the usual manner.

The load carrying device comprises a hood generally indicated at 4 made up of two inverted U shaped frame members 5 and 6 secured at their terminal ends to cross members 7 by rivets, screws or the like indicated at 8. The upper ends of the frame members are interconnected by a reinforcing bar 9 turned upwardly as at 10 at both of its ends. To the framework I secure by means of screws or rivets 11 a sheet metal covering 12 which forms the hood proper.

The bottom sides of the hood are secured to the wheel axle 3 by means of apertures 3A formed in the cross members 7 through which the axle extends.

To each U-shaped member 5 and 6, I secure near its upper end, by a bolt 13, an arm 14 which is adjustably mounted to the U-shaped member by means of an elongated slot 15 through which the bolt 13 passes. The outer end of each arm is turned back on itself as at 16 and provided with a bolt and nut 17 for clamping the arm to either the rearward frame members of the bicycle, as shown in Figure 1, or to the front wheel fork of the bicycle, while the bottom sides of the hood are secured to the wheel axles, as aforesaid.

Near the lower ends of the U-shaped members 5 and 6 I provide brackets 18 formed with apertures 19 for attaching the bottom ends of a pair of saddle bags (not shown) or a similar divided load carried by the hood to the bottom four corners thereof.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A load carrying device adapted for attachment to a bicycle, comprising in combination, an inverted U-shaped hood, said hood comprising a pair of inverted U-shaped frames having a covering secured to said frames, a reinforcing bar interconnecting the upper ends of said frames and turned upwardly at both of its ends to form stops for limit of movement of a load carried by the hood, cross members secured to the bottom edges of the hood and formed with means for attachment to either wheel axle of said bicycle, means secured to each bottom corner of said hood for attachment to the corners of a load carried by said hood, and adjustable arms extending outwardly from one end of said hood for attachment to the frame of the bicycle.

LUCIAN W. HAMPTON.

REFERENCES CITED

The following references are of record in the file of this patent:

UNITED STATES PATENTS

| Number | Name | Date |
|---|---|---|
| 299,609 | Wood | June 3, 1884 |
| 600,364 | Hill | Mar. 8, 1898 |
| 1,362,162 | Bradley | Dec. 14, 1920 |
| 1,963,333 | Morales | June 19, 1934 |